Dec. 25, 1956 H. T. BLUM 2,775,236
SAW BLADE FOR CUTTING STONE
Filed Oct. 6, 1955 2 Sheets-Sheet 1
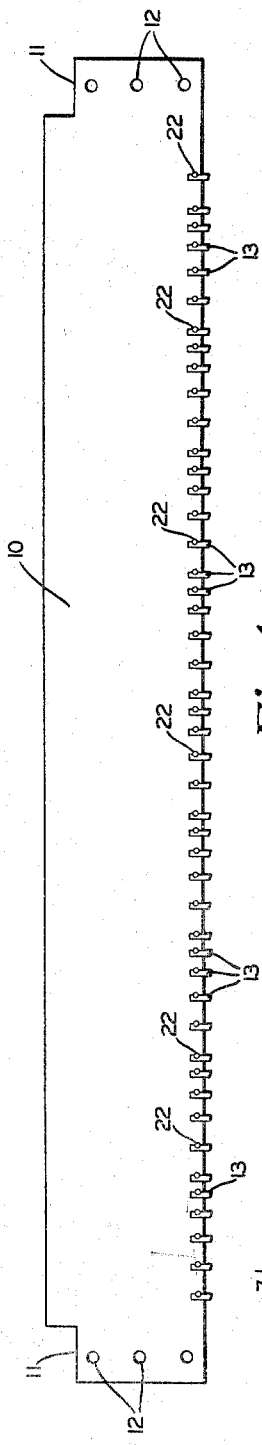
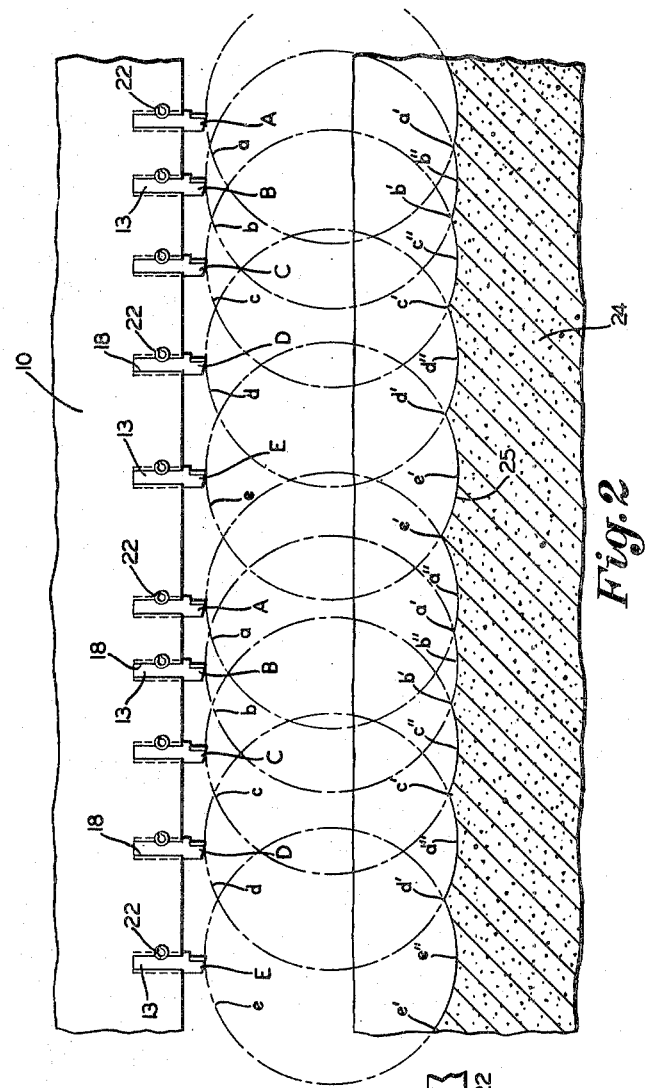
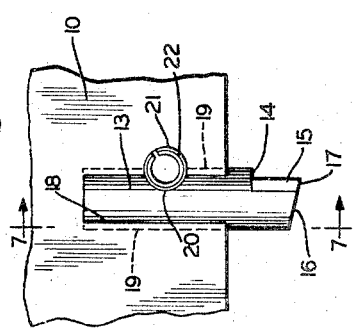
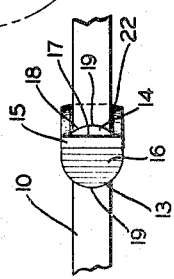
INVENTOR.
Harold T. Blum
BY
Frease & Bishop
ATTORNEYS Dec. 25, 1956
H. T. BLUM
2,775,236
SAW BLADE FOR CUTTING STONE
Filed Oct. 6, 1955
2 Sheets—Sheet 2
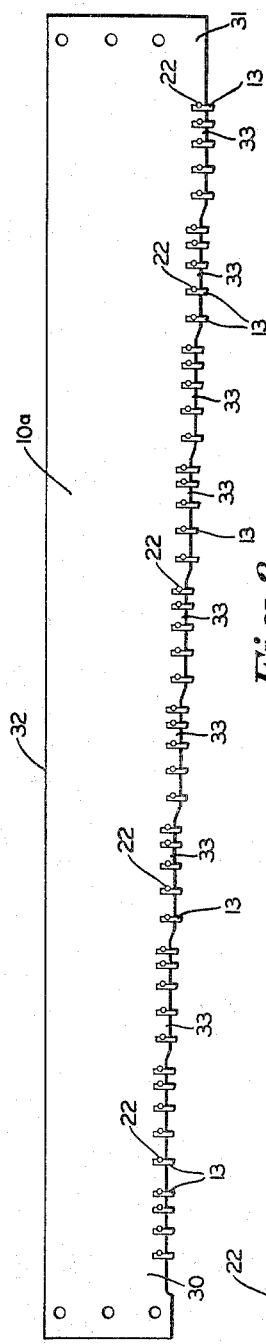
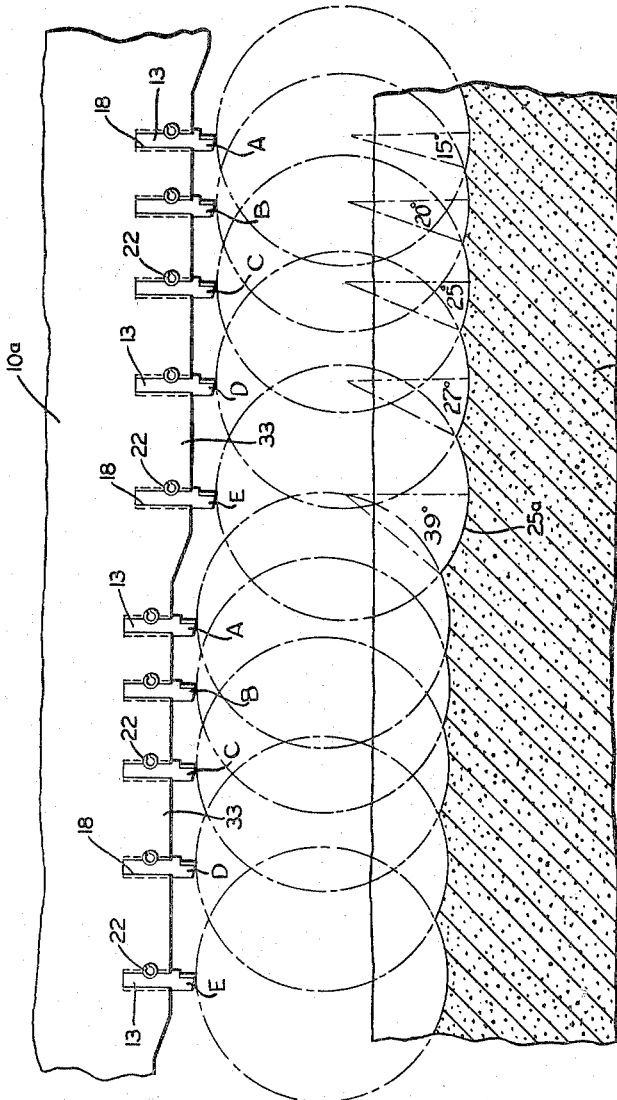
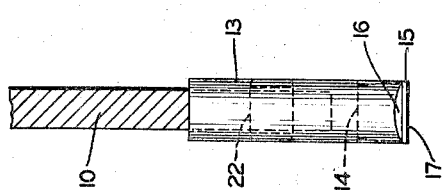
INVENTOR.
*Harold T. Blum*
BY
*Frease & Bishop*
ATTORNEYS

United States Patent Office 2,775,236
Patented Dec. 25, 1956

2,775,236

SAW BLADE FOR CUTTING STONE

Harold T. Blum, Millersburg, Ohio, assignor to The Briar Hill Stone Company, Glenmont, Ohio, a corporation of Ohio Application October 6, 1955, Serial No. 538,847

10 Claims. (Cl. 125—18)

The invention relates to saw blades for cutting stone, and more particularly to an inserted tooth saw blade especially adapted for use in a gang saw stone cutting machine such as disclosed in my prior applications, Serial No. 424,912, filed April 22, 1954, and Serial No. 476,483, filed December 20, 1954, now Patents No. 2,720,199 and No. 2,720,200 respectively, dated October 11, 1955.

Such stone cutting machines are adapted for cutting large blocks of stone, as received from the quarry, into a plurality of slabs of desired thickness. In machines of this type, a plurality of saw blades, with inserted hardened teeth, are located in a gang saw frame which is continuously moved in a circular path and at the same time continuously moved vertically relative to the block of stone, so as to cut vertical kerfs in the stone, separating the block of stone into a plurality of slabs.

Due to the circular path in which the gang saw blades are moved, the saw teeth cut into the stone only during the forward movement of the blades, thus intermittently moving the cuttings, stone dust and sludge forwardly and out of the kerfs. Thus, the saw teeth are intermittently contacting the stone throughout the entire cutting operation, and each contact of the saw teeth with the stone produces a resultant shock, and causes stresses and strains in the saw blade.

Since the teeth are located at equally spaced points throughout the length of each blade, all of the teeth in each blade will contact the stone simultaneously upon each downward and forward movement of the blade, thus multiplying the shock, stresses and strains upon the blade by the number of teeth therein.

It is also pointed out that with such a construction of saw blade, the upward and forward scraping action of the teeth is equal to the downward and forward cutting action thereof, thus reducing the efficiency of the blades.

Further, in my prior patents above referred to, the entire gang of saw blades is inclined downwardly and forwardly in order to facilitate the forward feeding and removal of cuttings, stone dust and sludge from the kerfs cut in the stone by the saw blades.

The present invention contemplates the provision of a saw blade which overcomes the above-mentioned difficulties and disadvantages.

Another object of the invention is to provide a saw blade so constructed that the shock, stresses and strains thereon will be reduced to a minimum.

A further object is to provide such a saw blade in which the teeth are located in similar groups throughout the length of each blade, the teeth in each group being variably spaced so that only one tooth in each group will make contact with the stone at the same time, whereby the shocks, stresses and strains upon the blade will be distributed over each stroke of the blades.

A still further object is to provide a saw blade of this character in which the teeth of each group are spaced progressively further apart.

Another object of the invention is to provide a saw blade of the character referred to in which the downward cutting action of the majority of the teeth in each blade is increased while the upward scraping action thereof is decreased.

A further object is to provide such a saw blade in which the groups of teeth are progressively stepped from one end of the blade to the other.

A still further object is to provide a saw blade of this character which may be mounted in a gang saw frame in horizontal position and adapted to cut a forwardly and downwardly inclined kerf whereby removal of cuttings, stone dust and sludge is facilitated.

And finally, it is an object of the invention to provide a saw blade construction which efficiently and economically attains the above objects.

The above objects together with others which will be apparent to those skilled in the art, or which may be later referred to, may be attained by constructing the improved saw blade in the manner illustrated in the drawings, and described in detail herein.

In general terms, the invention may be briefly described as comprising a saw formed of a flat blade of steel or the like preferably having hardened teeth inserted in one edge thereof, the teeth being located in similar groups throughout the length of the blade, the teeth in each group being located at progressively increasing distances apart from the rear end of the group to the forward end thereof.

For the purpose of cutting a forwardly and downwardly inclined kerf in the stone so as to facilitate the removal of cuttings, stone dust and sludge therefrom, the groups of teeth may be located at progressively lower positions from the rear end of the blade toward the forward end thereof.

Each of the insert teeth may be formed of a section of round rod or bar with the lower end thereof beveled or chamfered and cut out to receive a facing of carbaloy or the like forming the cutting edge of the tooth.

Substantially perpendicular slots are formed in the lower edge of the saw blade to receive the tooth inserts, opposite sides of the slots being rounded to fit the rounded sides of the inserts. Transversely disposed, registering, half-round grooves are cut in opposed faces of each insert and groove for receiving a roll pin for locking the inserts in the blade.

Having briefly described the invention in general terms and pointed out the objects thereof, preferred embodiments of the invention, illustrative of the best mode in which applicant has contemplated applying the principles, are set forth in detail in the following description and illustrated in the accompanying drawings, in which:

Fig. 1 is a side elevation of a saw blade embodying the invention, having a plurality of groups of variably spaced teeth;

Fig. 2 is an enlarged, fragmentary side elevation of a portion of the saw blade showing one complete group of variably spaced teeth and the manner in which the teeth cut a kerf in a block of stone;

Fig. 3 is a side elevation of a modified embodiment of the saw blade, wherein the groups of teeth are progressively stepped from one end of the blade to the other;

Fig. 4 is an enlarged, fragmentary side elevation of a portion of the saw blade shown in Fig. 3, showing the manner in which the teeth cut a kerf in a block of stone;

Fig. 5 is an enlarged elevation of a tooth insert showing the manner in which the same is locked in the saw blade;

Fig. 6 is a bottom plan view of the tooth insert;

Fig. 7 is a transverse sectional view of the blade showing the rear side of the tooth insert, taken as on the line 7—7, Fig. 5; and, Fig. 8 is an elevation of one of the roll pins which lock the tooth inserts in the blade.

Referring now more particularly to the embodiment of the invention shown in Figs. 1 and 2, and to the construction and arrangement of the tooth inserts shown in detail in Figs. 5 to 8, in which similar characters refer to similar parts throughout, the improved saw includes the straight, flat blade 10 in the form of an elongated, flat strip of steel or the like of suitable length for attaching in a gang saw frame of the general type shown in my prior patents above referred to, and of sufficient width and thickness to permit the same to be used for cutting stone.

For the purpose of mounting the saw blade in such a gang saw frame, opposite ends of the blade 10 may be cut out as at 11, and apertures 12 may be formed in each end of the blade to receive attaching bolts or the like.

Instead of the conventional smooth blade now in general use for sawing stone, the saw blade embodying the present invention is provided with teeth, and, as differentiated from conventional types of saw blades having teeth spaced at equidistant points, an important feature of the invention comprises the arrangement of the teeth in a plurality of groups with the teeth in each group variably spaced so that, when the saw blade is operated in a circular path, the teeth in each group will contact the stone at different times, whereby the shock of impact will be distributed over the several teeth of each group instead of having the entire shock load at one time, as where all teeth on a blade contact the work at the same instant.

Preferably, the teeth in each group are so spaced that they are progressively further apart from the forward end to the rear end of the group, as such a spacing not only properly distributes the shock load, but it also produces a more efficient cutting action in providing for a longer period of downward cutting action and a relatively shorter period of upward scraping action during the time when each tooth is in contact with the stone.

The teeth are preferably in the form of inserts, as shown in detail in Figs. 5 to 8, each tooth comprising a substantially cylindrical body portion 13, formed from a round bar of steel or the like, having a cut-out 14 in the forward side of its lower end portion.

A sharpened facing 15 of carbaloy or similar hardened material is welded, soldered or otherwise rigidly attached within this cut-out portion, and the lower end of the tooth body portion 13 is beveled or chamfered downwardly and forwardly as at 16, to the cutting edge 17 of the carbaloy facing 15.

For the purpose of mounting the tooth inserts in the saw blade, perpendicular slots 18 are cut in the lower edge of the blade 10, opposite side edges of each slot being rounded, as indicated at 19, so as to conform to the contour of the cylindrical body portion 13 of the tooth. Each slot 18 is of proper length so that when a tooth insert is seated therein, the lower end of the tooth containing the carbaloy facing 15 will extend below the lower edge of the blade, as best shown in Fig. 5.

In order to detachably lock the tooth inserts rigidly in the blade, registering, substantially half-round notches 20 and 21 are formed in the forward side of each tooth body portion 13 and in the adjacent side of the corresponding slot, and a roll pin 22 is driven into the circular opening formed by the meeting notches 20 and 21.

This roll pin is preferably of hollow, cylindrical split ring formation and may be formed of steel or the like having sufficient inherent spring property to permit the same to be slightly compressed when driven into place, so that the hollow roll pin will be under tension, thus tightly locking the insert tooth within the blade. Opposite ends of the roll pin 22 may be tapered, as indicated at 23, to facilitate the insertion thereof.

As shown in Figs. 1 and 2, the teeth are arranged in a plurality of similar groups throughout the length of the blade, each group comprising five teeth spaced progressively further apart from the forward end to the rear end of the group. This spacing of the teeth may increase by equal increments from front to back of each group.

For example, in a full size saw blade, the first and second teeth of a group, indicated at A and B respectively, may be spaced one inch apart, the third tooth C is spaced one and one-quarter inches back of tooth B, the fourth tooth D one and one-half inches from tooth C, the fifth tooth E one and three-quarter inches from tooth D, and the first tooth A of the next group is spaced two inches from the tooth E.

In Fig. 2 is shown the manner in which the individual teeth in each group contact the stone in succession on each stroke of the saw, so as to distribute the load shock over a considerable portion of each cycle, rather than subjecting the saw blade to the entire load shock at one time by simultaneous contact of all of the teeth with the work, as in conventional practice.

A portion of a block of stone is shown at 24 in Fig. 2, indicating the manner in which a kerf is cut therein by the improved saw blade. In this figure the saw blade is shown at the top of the stroke, and the paths of the teeth A, B, C, D and E are indicated by the circular lines $a$, $b$, $c$, $d$, and $e$ respectively. It should be pointed out that the teeth travel through these circular paths in counter-clockwise direction as viewed in Fig. 2.

Since these circular paths of the saw teeth overlap, the bottom of the kerf, indicated generally at 25 is made up of a series of arcuate cuts separated by projections, and, due to the variable spacing of the teeth these projections are of increasing height from front to rear, as indicated at $a'$, $b'$, $c'$, $d'$ and $e'$ respectively.

Thus it will be seen that in the operation of the saw blade, in each cycle the teeth E of each group will first contact the highest projections $e'$ in the bottom of the kerf, followed in succession by the teeth D contacting the next highest projections $d'$, the teeth C contacting the next projections $c'$, the teeth B contacting the next projections $b'$, and finally the teeth A contacting the lowest projections $a'$.

It has been found that in toothed saws operating in a circular path, the most efficient cutting action is obtained during the downward and forward movement from the time the teeth contact the stone until they reach the lowest point in the circular path, while during the upward and forward movement from this point the scraping action of the teeth upon the stone is less effective.

With the variable spacing of the teeth as provided in this invention, the period of downward and forward cutting action of the majority of the teeth is greater than the upward and forward scraping action, thus materially increasing the effectiveness of the saw blade.

This is illustrated in Fig. 2, in which it is obvious that the effective downward cutting period of the teeth B, C, D and E of each group is greater than the less effective upward scraping action. For instance, the most effective cutting action of the tooth B is on the downward and forward movement from the peak of the projection $b'$ to the bottom of the circular path indicated at $b''$, while the less effective upward scraping action of the tooth is between the point $b''$ and the peak of the projection $a'$. It is clearly seen that the distance from $b'$ to $b''$ is greater than the distance from $b''$ to $a'$.

In the same manner, the effective cutting period of the tooth C is from $c'$ to $c''$, which distance is greater than from $c''$ to $b'$; the cutting distance $d'$ to $d''$ of the tooth D is greater than $d''$ to $c'$; and the cutting distance $e'$ to $e''$ of the tooth E is greater than from $e''$ to $d'$. Thus it is evident that the effective cutting range of all but one of the teeth of each group is increased, proportionately increasing the effectiveness of the saw blade.

Referring now to the embodiment of the invention shown in Figs. 3 and 4, this is a carrying forward of the invention above described, and the grouping and variable spacing of the teeth upon the saw blade may be the same as shown in Figs. 1 and 2 and above described in detail. This form of the saw blade is so constructed that it may be mounted in a substantially horizontal or level gang saw frame to cut substantially forwardly and downwardly inclined kerfs in a stone, in the manner of forwardly and downwardly inclined gang saws.

To accomplish this purpose, the groups of variably spaced teeth are located at progressively lower points from the rear end of the saw blade to the forward end thereof. In order to provide for this arrangement of the teeth, the saw blade 10a, as shown in Figs. 3 and 4, may be of normal width at its rear end, as indicated at 30, and of increasing width toward its forward end 31. The top edge 32 of the blade is horizontal while the lower edge thereof is progressively inclined downward and forward.

As shown, this downward and forward inclination of the lower edge of the saw blade 10a is produced by the progressively downwardly stepped flat portion 33, from the rear end 30 to the forward end 31 of the blade. Each of these stepped portions 33 is of sufficient length to accommodate one group of variably spaced teeth. The construction, arrangement and variable spacing of the teeth may be the same as shown in Figs. 1 and 2, and above described, and, for the purpose of clarity, they are indicated by the same reference characters.

The cutting action of the teeth of each group is the same as above described in detail, so that the shock load is distributed in the same manner, and the effective cutting period of each tooth is increased, as above disclosed in detail. Further, the scraping action of tooth A from a'' to e' is substantially reduced due to the lowering of the tooth E in the next forward group of teeth.

Further, it will be seen that by progressively stepping the groups of teeth downwardly and forwardly, the bottom 25a of the kerf cut in the stone 24a will be generally inclined forwardly so as to facilitate the removal of cuttings, stone dust and sludge from the kerfs during the sawing operation.

As shown in Fig. 4, the lead tooth E of each group passes through an angle of about 39° from the time it contacts the stone until it reaches the bottom of its circular path. The succeeding teeth D, C, B and A respectively pass through angles of 27°, 25°, 20° and 15° respectively from the time they contact the stone until they reach the bottom of their circular paths.

Since all of the teeth of the group reach the bottom of their circular paths simultaneously, it will be evident that the second tooth D of the group passes through an angle of 12° after the lead tooth contacts the stone until it (the second tooth D) contacts the stone. In like manner it will be seen that the third tooth C moves through an angle of two more degrees before contacting the stone, the fourth tooth B moves through another 5° angle, and the last tooth A of the group moves through still another 5° angle before contacting the stone.

Thus it will be evident that the shock load is distributed over the cutting period. This distribution of the shock load is the same in each group of teeth in the blade, and is substantially the same in the blade shown in Fig. 2, as in Fig. 4.

From the above it will be obvious that the improved saw blade overcomes certain disadvantages and difficulties of conventional practice. The shock load of contact of the saw teeth is distributed over the entire cutting period because of the progressive contact of the teeth with the stone; the effective cutting range is increased because of the relatively longer period of downward and forward movement of the teeth in contact with the stone; and by progressively stepping the groups of teeth downwardly, the saw blades may be mounted in a horizontal or level gang saw frame to produce generally downwardly and forwardly inclined kerfs in the stone so as to facilitate removal of foreign matter during the cutting operation.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A saw blade for cutting stone, comprising an elongated straight blade having teeth along one longitudinal edge thereof, said teeth being arranged in a plurality of identical groups, the teeth in each group being variably spaced and conforming to the spacing of the teeth in each other group, the spacing of the teeth in each group progressively increasing from one end of the group to the other end thereof, and means for moving each tooth edge of said blade in a substantially circular path.

2. A saw blade for cutting stone, comprising an elongated substantially horizontal straight blade, teeth along one longitudinal edge of said blade, said teeth being arranged in a plurality of identical groups, the teeth in each group being variably spaced and conforming to the spacing of the teeth in each other group, the spacing of the teeth in each group progressively increasing from the forward end of the group to the rear end therof, means for moving each tooth edge of said blade in a substantially circular path.

3. A saw blade for cutting stone, comprising an elongated straight blade having teeth along one longitudinal edge thereof, said teeth being arranged in a plurality of identical groups, the teeth in each group being variably spaced and conforming to the spacing of the teeth in each other group, the spacing of the teeth in each group uniformly progressively increasing from one end of the group to the other end thereof, and means for moving each tooth edge of said blade in a substantially circular path.

4. A saw blade for cutting stone, comprising an elongated substantially horizontal straight blade, teeth along one longitudinal edge of said blade, said teeth being arranged in a plurality of identical groups, the teeth in each group being variably spaced and conforming to the spacing of the teeth in each other group, the spacing of the teeth in each group uniformly progressively increasing from the forward end of the group to the rear end thereof, and means for moving each tooth edge of said blade in a substantially circular path.

5. A saw blade for cutting stone, comprising an elongated substantially horizontal straight blade, teeth along one longitudinal edge of said blade, said teeth being arranged in a plurality of identical groups, the teeth in each group being variably spaced and conforming to the spacing in each other group, said groups of teeth being progressively stepped downward from one end of the blade to the other end thereof, and means for moving each tooth edge of the blade in a substantially circular path.

6. A saw blade for cutting stone, comprising an elongated substantially horizontal straight blade, teeth along one longitudinal edge of said blade, said teeth being arranged in a plurality of identical groups, the teeth in each group being variably spaced and conforming to the spacing of the teeth in each other group, said groups of teeth being progressively stepped downward from one end of the blade to the other end thereof, and means for moving each tooth edge of the blade in a substantially circular path.

7. A saw blade for cutting stone, comprising an elongated substantially horizontal straight blade, teeth along one longitudinal edge of said blade, said teeth being arranged in a plurality of identical groups, the spacing of the teeth in each group conforming to the spacing in each other group and progressively increasing from one end of the group to the other end thereof, said groups of teeth being progressively stepped downward from one end of the blade to the other end thereof, and means for moving each tooth edge of the blade in a substantially circular path.

8. A saw blade for cutting stone, comprising an elongated substantially horizontal straight blade, teeth along one longitudinal edge of said blade, said teeth being arranged in a plurality of identical groups, the spacing of the teeth in each group conforming to the spacing in each other group and uniformly progressively increasing from one end of the group to the other end thereof, said groups of teeth being progressively stepped downward from one end of the blade to the other end thereof, and means for moving each tooth edge of the blade in a substantially circular path.

9. A saw blade for cutting stone, comprising an elongated straight blade having teeth along one longitudinal edge thereof, said teeth being arranged in a plurality of identical groups, the teeth in each group being variably spaced and conforming to the spacing of the teeth in each other group, the spacing of the teeth in each group progressively increasing from one end of the group to the other end thereof, the groups of teeth being spaced apart a distance greater than the maximum spacing of the teeth in the groups, and means for moving each tooth edge of the blade in a substantially circular path.

10. A saw blade for cutting stone, comprising an elongated substantially horizontal straight blade, teeth along one longitudinal edge of said blade, said teeth being arranged in a plurality of identical groups, the teeth in each group being variably spaced and conforming to the spacing of the teeth in each other group, the spacing of the teeth in each group progressively increasing from the forward end of the group to the rear end thereof, the groups of teeth being spaced apart a distance greater than the maximum spacing of the teeth in the groups, and means for moving each tooth edge of the blade in a substantialy circular path.

References Cited in the file of this patent

UNITED STATES PATENTS

| 156,748 | Andrews | Nov. 10, 1874 |
| 364,459 | Young | June 7, 1887 |
| 462,482 | Forester | Nov. 3, 1891 |

FOREIGN PATENTS

| 2,875 | Germany | Feb. 2, 1878 |
| 607,662 | Great Britain | Sept. 2, 1948 |
| 741,168 | France | Feb. 8, 1933 |